Nov. 27, 1956 J. A. EAGAN 2,771,845
PROPORTIONING PUMP
Filed Jan. 11, 1955
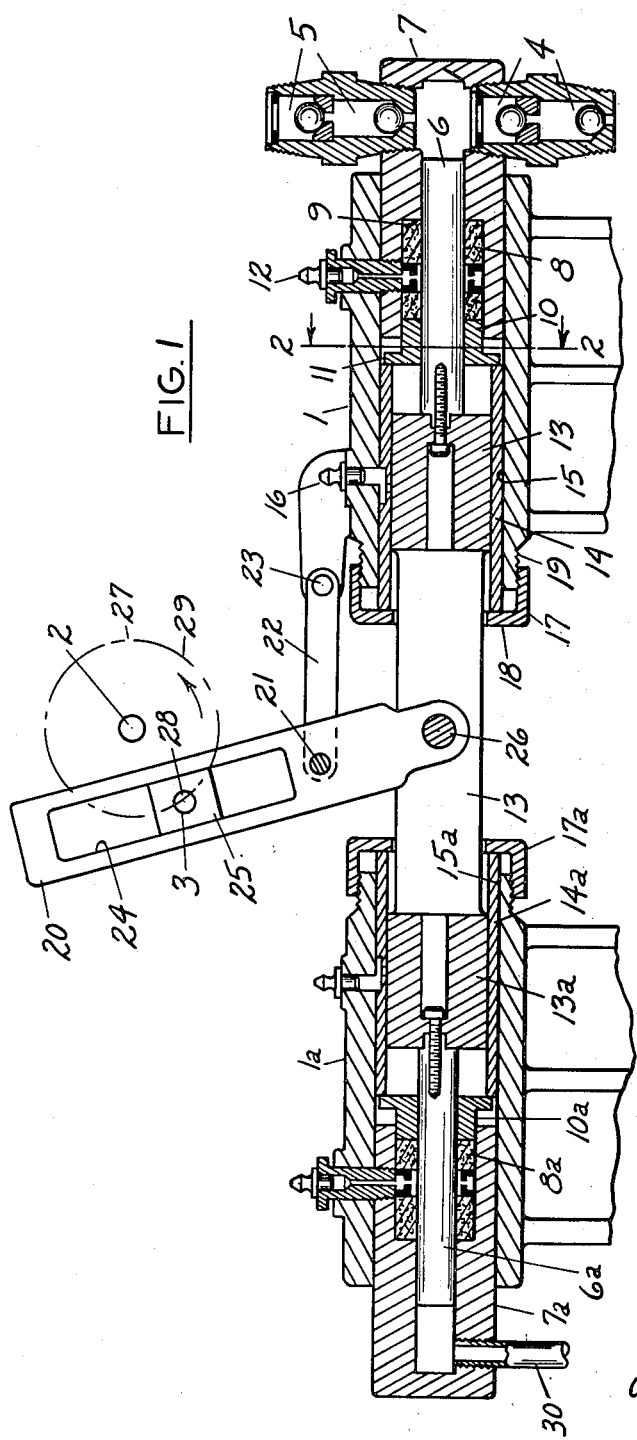
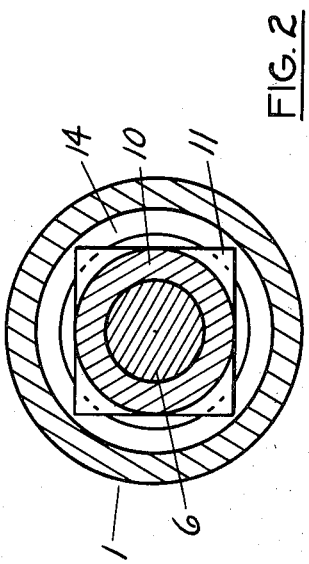
INVENTOR.
Joseph A. Eagan
BY
Ralph Hammar
Attorney

United States Patent Office 2,771,845
Patented Nov. 27, 1956

2,771,845
PROPORTIONING PUMP

Joseph A. Eagan, Philadelphia, Pa., assignor to Philadelphia Pump & Machinery Company, Philadelphia, Pa., a corporation of Delaware Application January 11, 1955, Serial No. 481,139

2 Claims. (Cl. 103—153)

This invention is a proportioning pump such as used to injet small quantities of chemicals for treating or blending. Features of a preferred form include the use of the cross head guide to tighten the piston packing so lateral forces on the packing are eliminated, a drive for the piston which makes the discharge stroke much longer than the intake stroke (e. g., three times as long), and an arrangement for utilizing the intake pressure to aid the discharge stroke even after the intake valves are closed.

In the drawing, Fig. 1 is a sectional side elevation of a proportioning pump, and Fig. 2 is a section on line 2—2 of Fig. 1.

The conventional parts of the pump are readily identified, 1 being the pump body, 2 the crank shaft, 3 the crank pin, 4 the intake valves, 5 the discharge valves, 6 the pump piston and 7 the cylinder. The valves 4 and 5 are located at the outer or head end of the cylinder. As the piston moves to the left, the valves 4 open and the valves 5 are held closed by the discharge pressure. As the piston moves to the right, the valves 4 close and the valves 5 open to allow the fluid to be forced through the valves as soon as the piston pressure exceeds the discharge pressure.

At the inner end of the cylinder 7, the piston 6 slides through a packing 8 which is compressed against a shoulder 9 in the cylinder 7 by a gland 10 having a square head 11 as shown in Fig. 2. While the packing provides a tight seal between the piston and cylinder, it cannot take any side thrust without objectionable wear even though kept well lubricated by a grease fitting 12. All side thrust on the packing is eliminated by making the piston 6 rigid with a cross head 13 carried in a cross head guide sleeve 14 slidable in a bore 15 in the pump body concentric with the cylinder 7. Lubrication for the cross head is provided by a grease fitting 16. A threaded sleeve 17 has an inwardly extending flange 18 which engages the outer end of the cross head guide sleeve 14 and forces the inner end of the cross head guide sleeve against the packing gland 10. The sleeve 17, which is threaded on a nipple 19 integral with the pump body, is readily accessible and permits external adjustment of the packing. It will be noted that all of the operating parts are centered on the pump body which minimizes misalignment and simplifies manufacture.

In the conventional pump having a connecting rod reciprocating the cross head, the intake and discharge strokes are equal, producing a pulsating flow even if two pumps are connected in parallel with the intake strokes offset 180°. In the present pump the crankshaft reciprocates the cross head through an inclined yoke 20 pivoted intermediate its ends at 21 on a link 22 which is pivoted at 23 on the pump body. The crank end of the yoke has a slot 24 for a shoe 25 on the crank pin 3. The other end of the yoke is pivoted at 26 on the cross head 13. As the crankshaft 2 rotates, the yoke 20 swings back and forth about pivot 21 between extreme positions in which the center line connecting the pivot 21 and the crank pin 3 is tangent to the crank pin circle 27. For the proportions illustrated, the intake stroke is counterclockwise from point 28 to 29 on the crank circle or 120° and the discharge stroke is counterclockwise from point 29 to point 28 on the crank circle or 240°. In other words, the discharge stroke is twice the intake stroke.

By moving the crankshaft closer to the pivot 21, the discharge stroke can be made three times the intake stroke so that the pump will discharge during three-fourths of each revolution of the crankshaft. This markedly reduces the pulsation in the pump delivery, particularly when two pumps are connected in parallel with their cranks offset 180° from each other.

In many applications, the pump is used to deliver at a high pressure from a source having only slightly less pressure so the differential pressure is small. In such applications, the pump must be powdered for the full discharge pressure rather than for the differential pressure. The need for this extra power is overcome by providing the cross head 13 with an extension 13a on the opposite side of the pivot 26. The extension 13a is guided in a cross head guide sleeve 14a in a bore 15a in a pump body 1a and is tightened against a packing gland 10a by a threaded sleeve 17a. On the cross head extension 13a is a piston 6a which slides in packing 8a in a cylinder 7a. The cylinder 7a has no discharge but has an intake fitting 30 connected to the source from which liquid is to be pumped. The pressure on the piston 1a aids the pressure or discharge stroke of the piston 1 so that the pump need be powered only for the differential pressure between the intake and discharge rather than for the full discharge pressure.

What is claimed as new is:

1. In a pump, a pump body, a cylinder in one end of the body having intake and discharge valves at one end of the cylinder, a packing within the body at the other end of the cylinder having a gland for tightening the packing, a piston having one end slidable through the packing into the cylinder, a cross head fixed to the other end of the piston, a cross head guide sleeve having one end engaging said gland, said pump body having a bore concentric with the cylinder in which the crosshead guide sleeve is slidable, and another sleeve threaded on the body and engaging the other end of the cross head guide sleeve to force the guide against the gland and tighten the packing.

2. In a pump, a pump body, a cylinder in one end of the body having intake and discharge valves at the head end of the cylinder, a packing within the body at the other end of the cylinder having a gland for tightening the packing, a piston having one end slidable through the packing into the cylinder, a cross head fixed to the other end of the piston, a cross head guide sleeve having one end engaging said gland, said pump body having a bore concentric with the cylinder in which the crosshead guide sleeve is slidable, another sleeve threaded on the body and engaging the other end of the cross head guide sleeve to force the guide against the gland and tighten the packing, another pump body in line with the first pump body and having another cylinder therein extending in a direction opposite to the first cylinder with the head end of the other cylinder most remote from the first cylinder, another piston in said other cylinder fixed to the cross head, and a continuously open intake to the head end of said other cylinder whereby the intake pressure acts on the other piston to aid the discharge stroke of the first piston.

References Cited in the file of this patent

UNITED STATES PATENTS

| | | |
|---|---|---|
| 1,432,041 | Scott | Oct. 17, 1922 |
| 1,636,440 | Riesner | July 19, 1927 |
| 1,850,083 | Noltein | Mar. 22, 1932 |
| 1,872,503 | Repschleger | Aug. 16, 1932 |

FOREIGN PATENTS

| | | |
|---|---|---|
| 8,721 | Great Britain | of 1911 |